Patented Nov. 6, 1928.

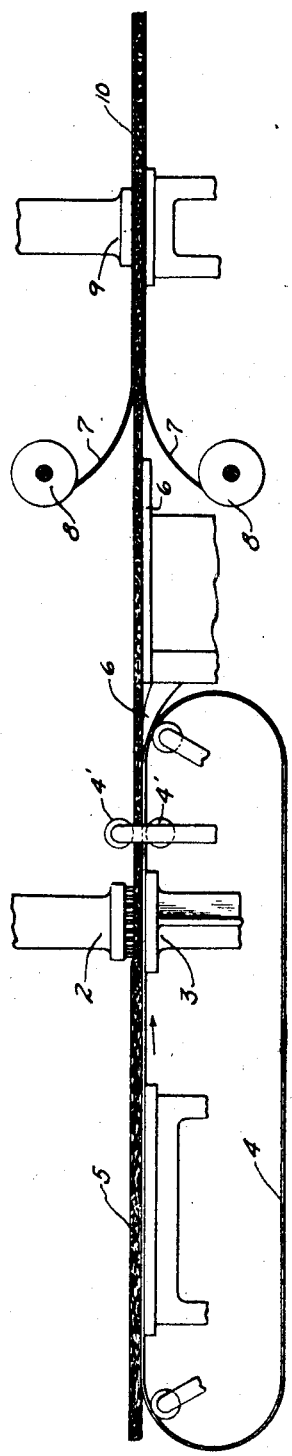

1,690,854

UNITED STATES PATENT OFFICE.

PERCY R. BETTISON, OF CHICAGO, ILLINOIS, ASSIGNOR TO TANNERS' PRODUCTS COMPANY, OF CHICAGO, ILLINOIS, A CORPORATION OF DELAWARE.

METHOD OF MAKING FELT PRODUCTS.

Application filed April 12, 1926. Serial No. 101,540.

The invention relates to a method of producing a felt product, such as is used for refrigerator linings and sound-deadening purposes.

One object of the invention is to provide a method of forming a loosely punch-felted body of animal hair, or other suitable feltable fibres, by a continuous process and without the use of the usual burlap or fabric reinforcement.

A further object of the invention is to provide a process for making a felt insulating product by a continuous process of forming a loosely punch-felted body of animal hair, or other suitable feltable fibres, provided with a protective heat-insulating covering which is stitched thereto without rehandling the material.

The invention further consists in the method and steps of the method hereinafter set forth, and more particularly defined by claims at the conclusion hereof.

The drawing is a diagramatic view showing the steps of the method embodying the invention and the apparatus.

In the drawing the numeral 2 designates the vibrating needle-carrying member of a needle loom, 3 the table of such loom, and 4 an endless belt of loosely woven material, such as burlap, which is suitably driven by suitably driven feed rolls 4' to advance the bats 5 of felt through the needle loom, and to which the felt bats are punched as they pass through the loom. This punching operation has the effect of hardening together or felting the fibres, such as animal hair or other suitable feltable fibres forming the bat, so that the bats as successively fed to the belt 4 are formed in a continuous sheet of loosely punched felt, which sheet is separated from the belt 4, to which portions of it have been punched, by means of a cutter or separating knife or tool 6 disposed adjacent the delivery end of the belt 4.

The punched felt, after its separation from the belt 4, is led over a table 6 and between two sheets of covering material 7, such as waterproof paper, mounted on supply rolls 8, and passes with this covering through a suitable stitching machine 9 which puts spaced rows of stitching 10 through the coverings and the felted body to form the finished product.

What I claim as my invention is:

1. The method of forming a punch-felted body which consists in carrying the felt bats through a needle punching loom on a continuously moving endless conveyor to which parts of the felt are punched and thereafter cutting the sheet of punched felt from said conveyor.

2. The method of forming a felt-bodied insulation material which consists in carrying the felt bats through a needle punching loom on a continuously moving endless conveyor to which parts of the felt are punched, cutting the sheet of punched felt from said conveyor, feeding this sheet between sheets of covering material and stitching the covering sheets and the sheet of punched felt together.

3. The method of forming a punch-felted body which consists in carrying the felt bats through a needle punching loom on a conveyor to which parts of the felt are secured during the punching process and thereafter cutting the sheet of punched felt from said conveyor.

In testimony wherof, I affix my signature.

PERCY R. BETTISON.